(12) United States Patent
Yang

(10) Patent No.: US 8,746,906 B2
(45) Date of Patent: Jun. 10, 2014

(54) LIGHT SOURCE MODULE FOR MACRO PHOTOGRAPHY

(75) Inventor: Chih-Yi Yang, Taipei (TW)

(73) Assignee: Lumos Technology Co., Ltd., Taipei (TW)

( * ) Notice: Subject to any disclaimer, the term of this patent is extended or adjusted under 35 U.S.C. 154(b) by 290 days.

(21) Appl. No.: 13/431,182

(22) Filed: Mar. 27, 2012

(65) Prior Publication Data

US 2012/0257370 A1      Oct. 11, 2012

(30) Foreign Application Priority Data

Apr. 7, 2011   (TW) .................................. 100206074

(51) Int. Cl.
  *G03B 15/02*   (2006.01)
(52) U.S. Cl.
  USPC .................. 362/11; 362/3; 348/370; 396/199

(58) Field of Classification Search
  USPC ................... 362/3, 11, 14; 396/199; 348/370
  See application file for complete search history.

(56) References Cited

U.S. PATENT DOCUMENTS 8,594,495 B2 *   11/2013   Yang ............................. 396/199

* cited by examiner

*Primary Examiner* — Stephen F Husar
(74) *Attorney, Agent, or Firm* — Chun-Ming Shih; HDLS IPR-Services

(57) ABSTRACT

A light source module for macro photography is disclosed. The light source module is for connecting to a lens of an image capturing apparatus and bearing against a plane surface to capture the image of the plane surface. The light source module includes a barrel, a contact unit and a lighting unit. The barrel has a rear portion for connecting to the lens and a front portion opposite to the rear portion. The contact unit is arranged on an end face of the front portion. The contact unit has a plurality of contact pads arranged at intervals on the end face for contacting with the plane surface. The lighting unit is arranged on the inner surface of the barrel.

9 Claims, 4 Drawing Sheets

LIGHT SOURCE MODULE FOR MACRO PHOTOGRAPHY

BACKGROUND OF THE INVENTION

1. Field of the Invention

This invention relates to a light source module, in particularly to a light source module for macro photography.

2. Description of Related Art

As criminal activities keep evolving, nowadays scientific investigation has become an important source for police or prosecutors to obtain clues. One of the most used methods of scientific investigation is fingerprint identification. Due to the uniqueness of individual's fingerprints, collecting and verifying to the fingerprint can provide a more specific way to seize crime evidence.

Because fingerprint is not easy to be recognized by naked eyes under most of situations, powder substance is often provided on the fingerprint for enhancing the visibility of the fingerprint to the naked eye. However, in case that the fingerprint is found on smooth surface of glass or the like material, a significant amount of light emitted from flash light of camera will be reflected by the smooth surface and consequently form a white spot in the captured image due to over exposure. The white spot is sometimes located within the area of fingerprint and causes at least a portion of the fingerprint can not be recognized.

Therefore, there is a need of a novel light source module for macro photography, which is capable of solving the above problem and capturing clear image of the fingerprint for police or prosecutor on criminal investigation. In addition, when capturing image of the fingerprint, the lens of the camera is extremely close to the fingerprint or sometimes directly contacts with the fingerprint, thus the fingerprint may be destroyed by the lens and the lens is easy to be contaminated by the fingerprint.

SUMMARY OF THE INVENTION

The objective of the invention is to provide a light source module for macro photography, which is capable of clearly performing macro photography and prevents intercontamination between the lens and the object.

For achieving the above objective, the invention provides a light source module for macro photography, which is configured for connecting to a lens of an image capturing apparatus and bearing against a plane surface to capture the image of the plane surface. The light source module includes a barrel, a contact unit and a lighting unit. The barrel has a rear portion for connecting to the lens and a front portion opposite to the rear portion. The contact unit is arranged on an end face of the front portion and having a plurality of contact pads arranged at intervals on the end face for contacting with the plane surface. The lighting unit is arranged on the inner surface of the barrel.

DETAILED DESCRIPTION OF THE INVENTION

A detailed description of the present invention will be made with reference to the accompanying drawings.

Figure 1:
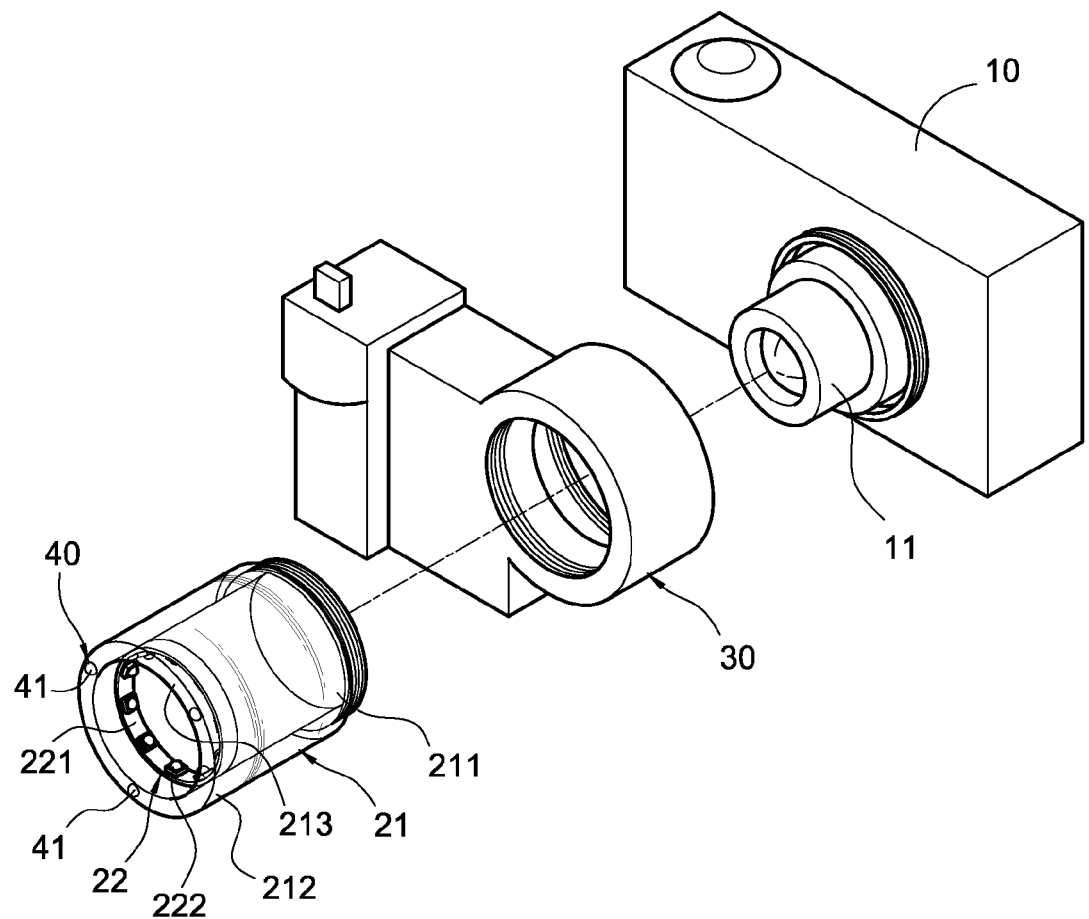
FIG. 1 is an exploded view of a light source module for macro photography according to an embodiment of the present invention.

FIG. 1 shows a light source module for macro photography according to an embodiment of the present invention. The light source module is for connecting to a lens 11 of an image capturing apparatus 10. The light source module mainly includes a barrel 21, a lighting unit 22, an adapter 30 and a contact unit 40. In this embodiment, the image capturing apparatus 10 is a commercial digital camera for example. In practice, the image capturing apparatus 10 can also be photographing module of the cellular phone or any electronic device having the photographing function.

The barrel 21 has a rear portion 211 for connecting to the lens 11 and a front portion 212 opposite to the rear portion 211. The barrel 21 can be made of transparent or opaque material. In this embodiment, the barrel 21 is a hollow cylindrical tube for example.

The lighting unit 22 is arranged on the inner surface of the front portion 212. In this embodiment, the lighting unit 22 has a ring belt 221 and a plurality of light emitting diodes 222 arranged on the ring belt 221. In practical, the lighting unit 22 includes at least one light emitting diode 222. The light emitted from the light emitting diode 222 can be infrared light, visible light or ultraviolet light, and can be chosen according to the object to be illuminated.

Besides, for the purpose of facilitating manufacture the light source module, the ring belt 221 can be made from the flexible printed circuit board. After the light emitting diodes 222 are arranged on the ring belt 221, the ring belt 221 can be easily bent for fitting into the barrel 21.

The adapter 30 is used for adapting the barrel 21 into the image capturing apparatus 10. The adapter 30 includes an electrical power (not shown) for supplying the lighting unit 22. For example, the electrical power includes at least one battery cell.

The contact unit 40 is arranged on an end face 213 of the front portion 212. The contact unit 40 has a plurality of contact pads 41 arranged on the end face 213. In this embodiment, the contact unit 40 has three contact pads 41 arranged at intervals. The contact pads 41 and the barrel 21 are one piece formed.

Figure 2:
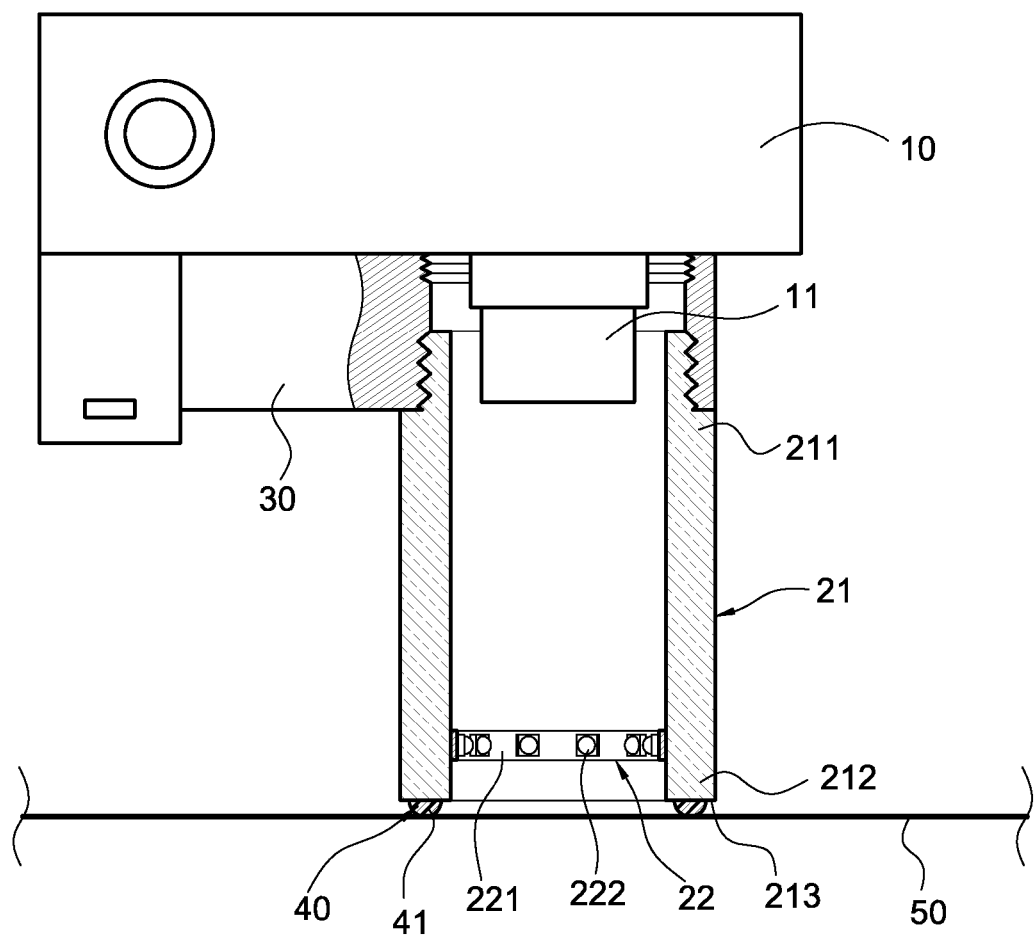
FIG. 2 is an cross sectional view of the light source module in FIG. 1.

As FIG. 2 shows, in practical use, the image capturing apparatus 10 is supported on a plane surface 50 by the barrel 21 and the contact unit 40. User needs not to hold the image capturing apparatus 10 while capturing the image of the plane 50. The contact pad 41 has a cross section of semi-circular shaped. By using the contact pads 41 to minimize the contact area between the barrel 21 and the plane surface 50, the barrel 21 will hardly contact with the substance on the plane surface 50. Therefore, while capturing the image of fingerprint, the damage to the fingerprint can be minimized. Besides, since the possibility of the contamination attaching to the barrel 21 is reduced, when consecutively collecting the other fingerprint, other fingerprint will not be contaminated and cross contamination can be prevented.

Figure 3:
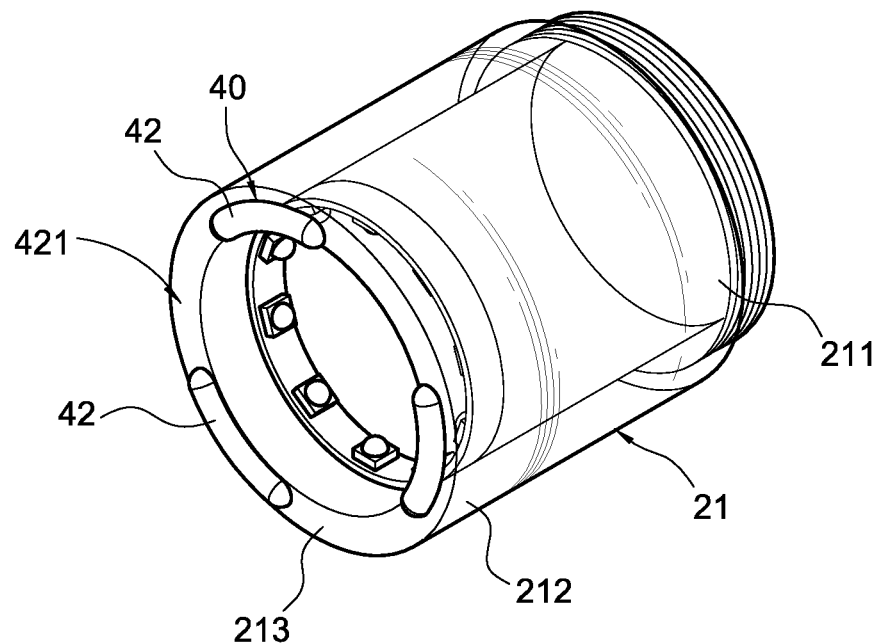
FIG. 3 is perspective view of a light source module for macro photography according to another embodiment of the present invention.

FIG. 3 shows a light source module for macro photography according to another embodiment of the present invention. The light source module of this embodiment is substantially the same as the embodiment shown in FIG. 1 and FIG. 2. The difference is that the contact pad 42 of the contact unit 40 extends along the end face 213 in an arc shape. Consequently, due to the extended length of the contact pad 42, the space 421 between any two adjacent contact pads 42 is smaller. When contacting with the plane surface, the contact pad 42 can prevent significant amount of external light from passing through and influence the image capturing.

Figure 4:
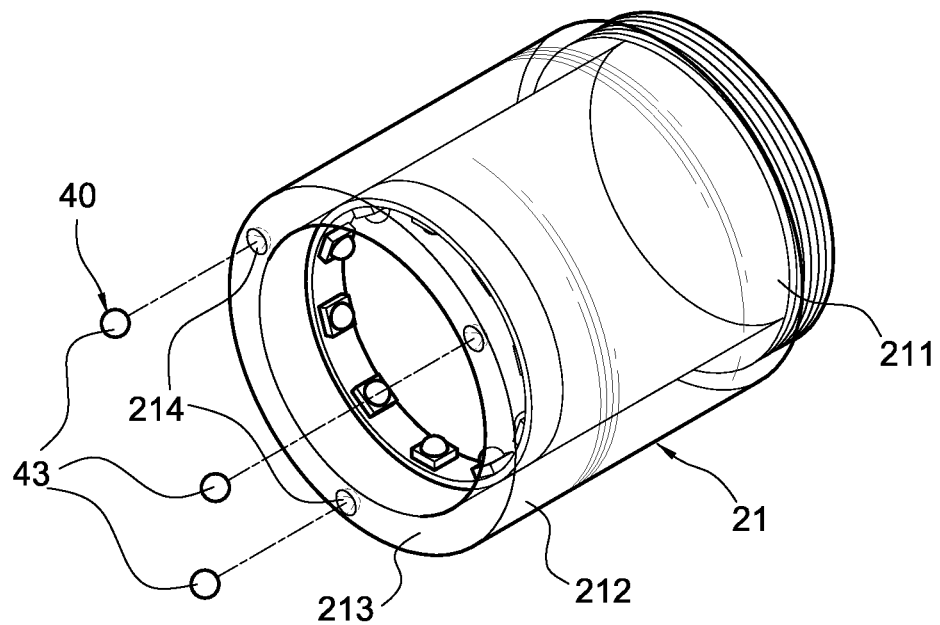
FIG. 4 is an exploded view of a light source module for macro photography according to another embodiment of the present invention.

FIG. 4 is another embodiment of the light source module for macro photography according to another embodiment of the present invention. The light source module of this embodiment is substantially the same as the embodiment shown in FIG. 1 and FIG. 2. The difference is that a plurality of grooves 214 are further formed on the end face 213 for detachably mounting the contact pads 43 of the contact unit 40. At least a part of the contact pad 43 protrudes out from the grooves 214. In this embodiment, the contact pads 43 are of spherical shaped, but not limited thereto in practical. After each capturing of image, the used contact pads 43 can be removed and new contact pads 43 can be put on. Thus, the intercontamination can be prevented.

Figure 5:
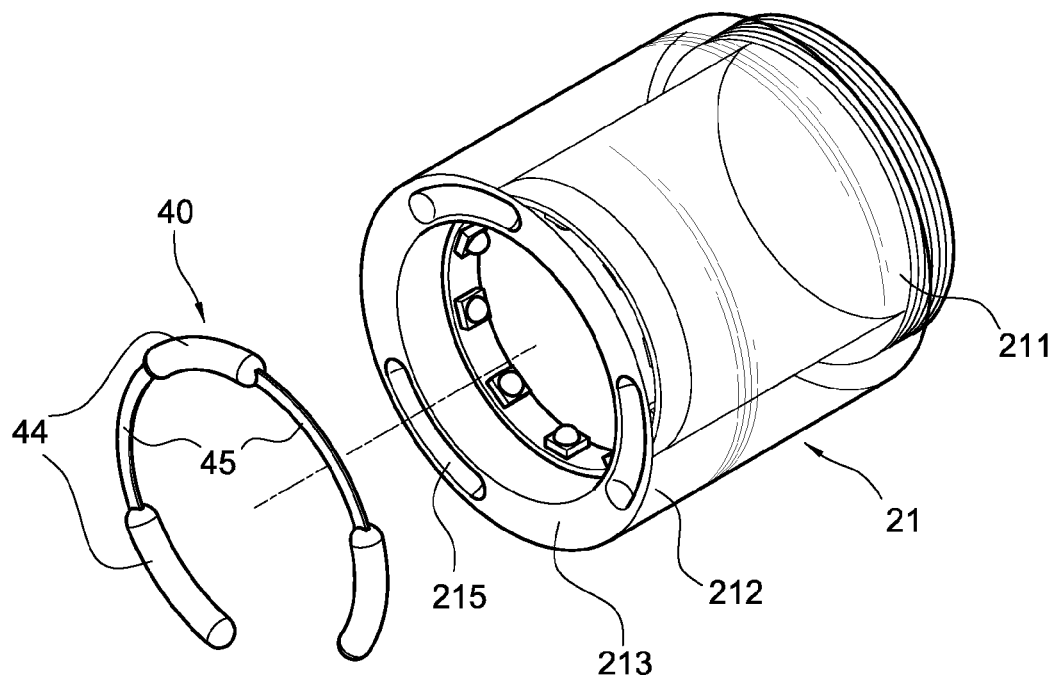
FIG. 5 is an exploded view of a light source module for macro photography according to another embodiment of the present invention.

FIG. 5 is another embodiment of the light source module for macro photography according to another embodiment of the present invention. The light source module of this embodiment is substantially the same as the embodiment shown in FIG. 4. The difference is that the contact pads 43 each extend along the end face 213 in an arc shape.

Figure 6:
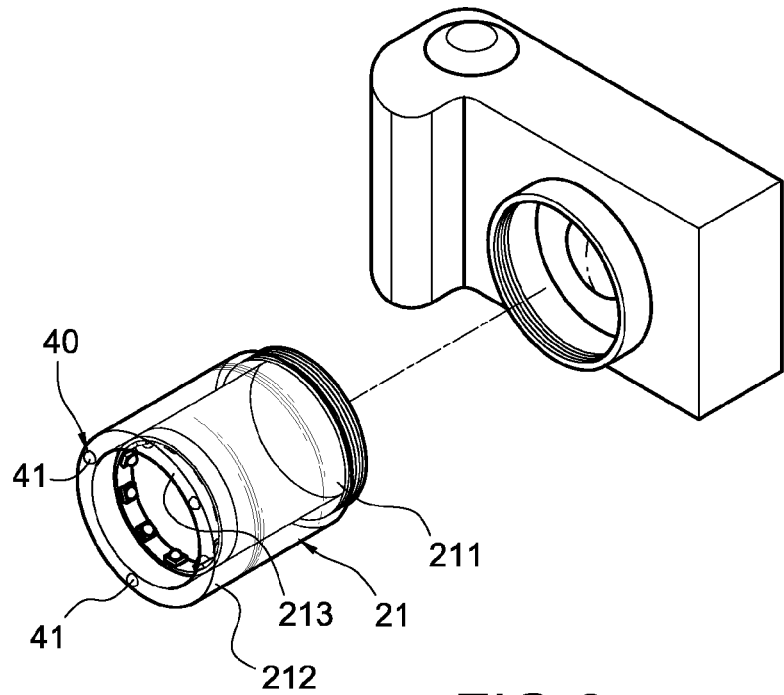
FIG. 6 is an exploded view of a light source module for macro photography according to another embodiment of the present invention.

FIG. 6 is another embodiment of the light source module for macro photography according to another embodiment of the present invention. The light source module of this embodiment is substantially the same as the embodiment shown in FIG. 1 and FIG. 2. The difference is that the light source module does not have the adapter. The barrel 21 is directly connected to the lens 11 of the image capturing apparatus.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A light source module for macro photography, the light source being configured for connecting to a lens of an image capturing apparatus and bearing against a plane surface to capture the image of the plane surface, the light source module comprising:
    a barrel having a rear portion for connecting to the lens and a front portion opposite to the rear portion;
    a contact unit arranged on an end face of the front portion and having a plurality of contact pads arranged at intervals on the end face for contacting with the plane surface; and
    a lighting unit arranged on the inner surface of the barrel.

2. The light source module as claim 1, wherein the contact pads and the barrel are one-piece formed.

3. The light source module as claim 1, wherein the contact unit comprises three contact pads arranged at intervals.

4. The light source module as claim 1, wherein the contact pads each have a cross section of semi-circular shaped.

5. The light source module as claim 1, wherein the contact pads are made of elastic material.

6. The light source module as claim 5, wherein the contact pads extends along the end face in an arc shape.

7. The light source module as claim 1, wherein a plurality of grooves formed on the end face for detachably mounting the contact pads of the contact unit.

8. The light source module as claim 7, wherein the contact unit further has at least one connecting part for connecting two of the adjacent contact pads.

9. The light source module as claim 1, further comprising an adapter for adapting the barrel to the image capturing apparatus.

* * * * *